United States Patent [19]

Terada

[11] Patent Number: 5,058,695
[45] Date of Patent: Oct. 22, 1991

[54] POWER STEERING APPARATUS
[75] Inventor: Tohru Terada, Saitama, Japan
[73] Assignee: Jidosha Kiki Co., Ltd., Tokyo, Japan
[21] Appl. No.: 482,276
[22] Filed: Feb. 20, 1990

[30] Foreign Application Priority Data

Feb. 20, 1989 [JP] Japan .............................. 1-18847[U]

[51] Int. Cl.$^5$ .............................................. B62D 5/06
[52] U.S. Cl. .................................................. 180/132
[58] Field of Search ........................ 180/132, 149, 79.1

[56] References Cited

FOREIGN PATENT DOCUMENTS

| 2825 | 1/1978 | Japan | 180/132 |
| 8757 | 1/1981 | Japan | 180/132 |
| 2003808 | 3/1979 | United Kingdom | 180/132 |

Primary Examiner—Charles A. Marmor
Assistant Examiner—Alan M. Kager
Attorney, Agent, or Firm—Flynn, Thiel, Boutell & Tanis

[57] ABSTRACT

A power steering apparatus which is provided with a rotary valve. An input shaft and an output shaft are disposed in coaxial relationship and connected together by a torsion bar. A valve rotor is formed on the input shaft while a valve sleeve is connected to the output shaft and disposed in surrounding relationship with the valve rotor to define a rotary valve. A buffering member comprising a material such as rubber or resin is interposed between the opposing surfaces of the output shaft and the valve sleeve.

5 Claims, 4 Drawing Sheets

POWER STEERING APPARATUS

BACKGROUND OF THE INVENTION

The invention relates to a power steering apparatus, in particular, to such apparatus which is provided with a rotary valve.

Power steering apparatus supplies a force which assists in a steering operation in response to a turning operation of a steering wheel, by operating a control valve to switch a fluid path to deliver a pressure oil discharged from a hydraulic pump to a power cylinder or to displace such oil therefrom. A rotary valve may be used as such a control valve, and generally comprises an input shaft which is operated for rotation by the steering wheel, an output shaft coupled to the input shaft through a torsion bar and having a pinion formed thereon which is adapted to mesh with a rack, a valve rotor formed around the peripheral surface of the input shaft, and a valve sleeve fitted in surrounding relationship with the rotor and rotationally coupled to the output shaft through a pin. One end face of the sleeve abuts against the end face of the output shaft while the other end face abuts against a retainer which is fitted around the input shaft to limit its axial displacement.

In the conventional power steering apparatus constructed in a manner mentioned above, it is necessary that a clearance be provided axially and circumferentially around the valve sleeve, and there is no remedy which would attenuate resulting vibration of the sleeve caused by the fluid. The vibration of the sleeve is allowed to be transmitted to the output shaft and also to the input shaft through the torsion bar. In addition, acoustic oscillations within the valve which are caused by the fluid will be transmitted to the input shaft side.

SUMMARY OF THE INVENTION

It is an object of the invention to provide a power steering apparatus which is provided with a rotary valve in which the vibration of a valve sleeve is suppressed and in which acoustic oscillations caused by fluid is diminished.

DESCRIPTION OF EMBODIMENTS

Figure 1:
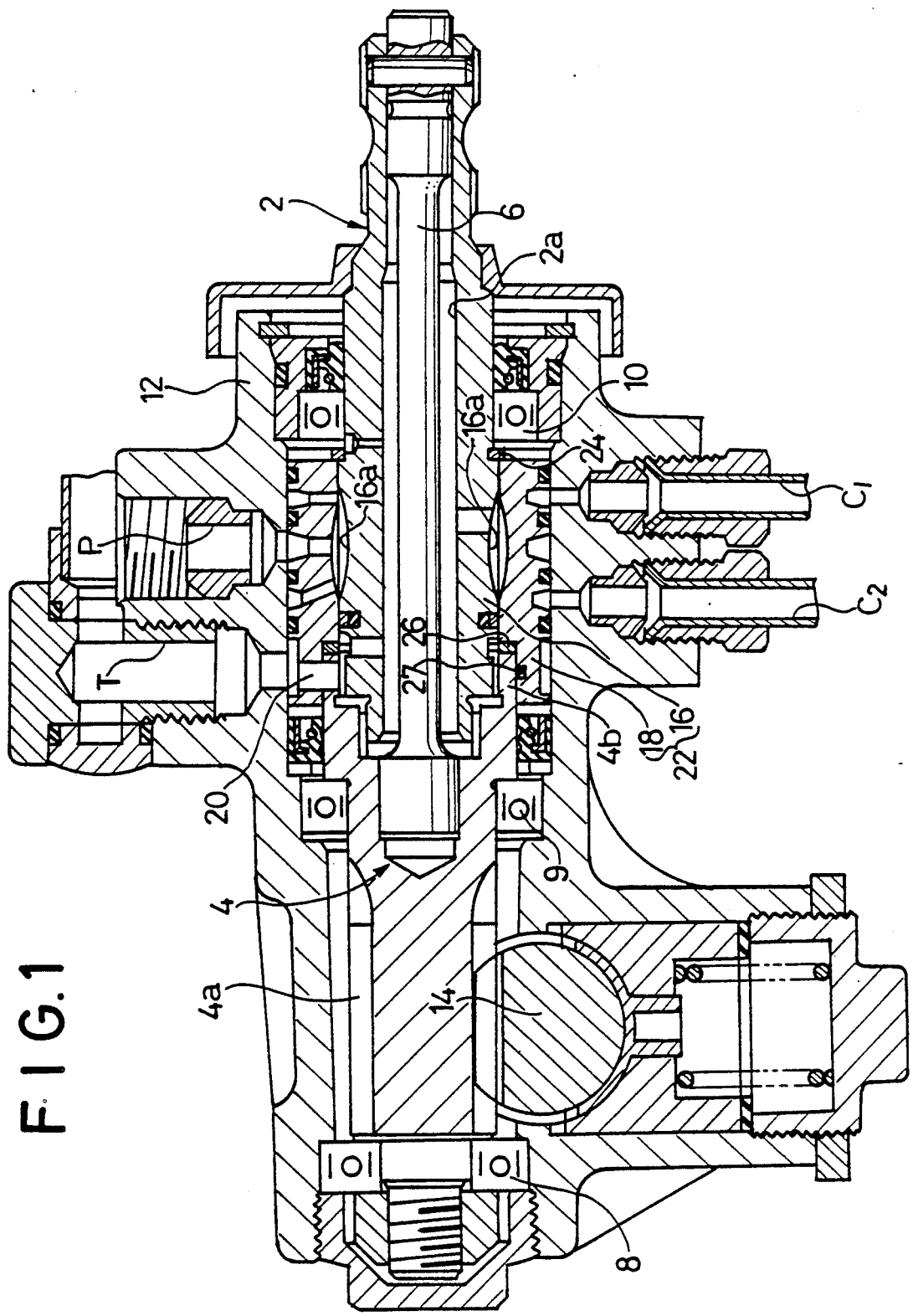
FIG. 1 is a longitudinal section of a power steering apparatus according to one embodiment of the invention.

Referring to the drawings, several embodiments of the invention will now be described. FIG. 1 is a longitudinal section of a power steering apparatus according to one embodiment of the invention. An input shaft or stubshaft 2 is coupled to a steering wheel, not shown, so as to be operated for rotation thereby. An output shaft or pinion shaft 4 is formed with a pinion 4a at its one end, and the both shafts 2 and 4 are coupled together through a torsion bar 6 which is disposed in a space 2a extending through the axis region of the input shaft 2. These members are rotatably disposed within a housing 12 by means of bearings 8, 9 and 10, thus allowing a relative rotation between the both shafts through a limited angular range. The pinion 4a meshes with a rack 14 to form a steering gear of rack and pinion type.

A valve rotor 16 is directly formed around the outer surface of the input shaft 2 while the output shaft 4 has a valve sleeve 18 connected thereto by a pin 20 for integral rotation therewith. The sleeve 18 is fitted over the valve rotor 16. The combination of the valve rotor 16 and the valve sleeve 18 forms a rotary valve 22. As is well known, the rotary valve 22 operates to switch fluid paths between a pump port P and a tank port T and ports $C_1$ and $C_2$ leading to the both chambers of a power cylinder, all of which are formed in the housing 12, in accordance with a relative rotational displacement between the input and the output shaft 2, 4 in response to a turning operation of a steering wheel.

Figure 2:
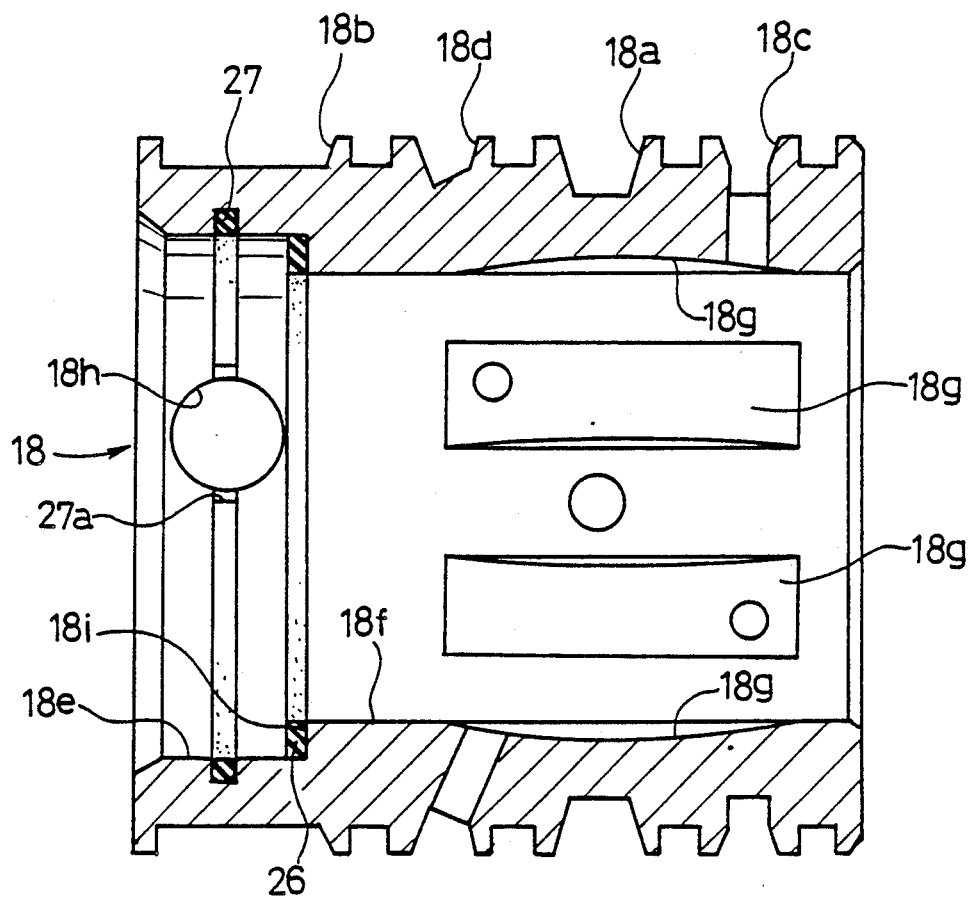
FIG. 2 is a longitudinal section of a valve sleeve.

As shown in FIG. 2, formed in the outer peripheral surface of the valve sleeve 18 are an annular groove 18a communicating with the pump port P, an annular groove 18b communicating with the tank port T, and annular grooves 18c and 18d communicating with the both cylinder ports $C_1$, $C_2$. The inner surface of the sleeve includes a greater diameter portion 18e located nearer the output shaft 4 and a remaining smaller diameter portion 18f in which a plurality of axially extending grooves 18g are formed which may be brought into and out of communication with a groove 16a (see FIG. 1) formed in the valve rotor 16.

Fitted into the greater diameter portion 18e is a cylindrical portion 4b of the output shaft 4 which is formed at its end located nearer the input shaft 2. The cylindrical portion 4b is formed with a notch 4c, and the valve sleeve 18 is formed with an opening 18h (see FIG. 4). The pin 20 extends through the notch 4c and the opening 18h to connect the valve sleeve 18 and the output shaft for integral rotation. The other end face, which is located on the right-hand side, as viewed in FIG. 1, of the valve sleeve 18 is disposed in abutment against a retainer 24 which is fitted around the input shaft 2, thereby limiting its axial movement.

Figure 3:
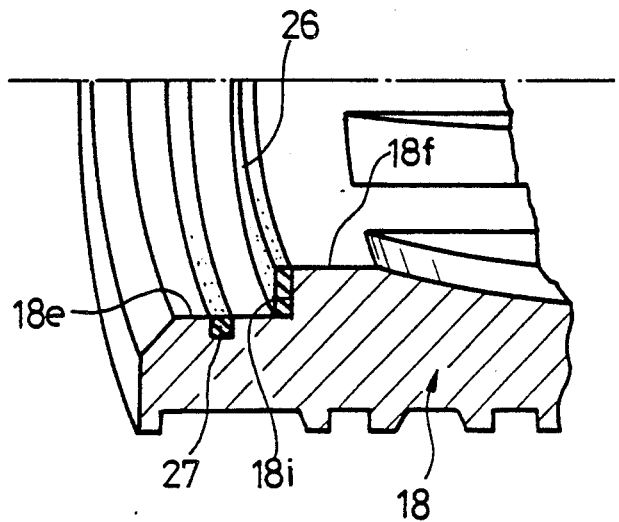
FIG. 3 is a perspective view, partly in section, of the valve sleeve.
Figure 4:
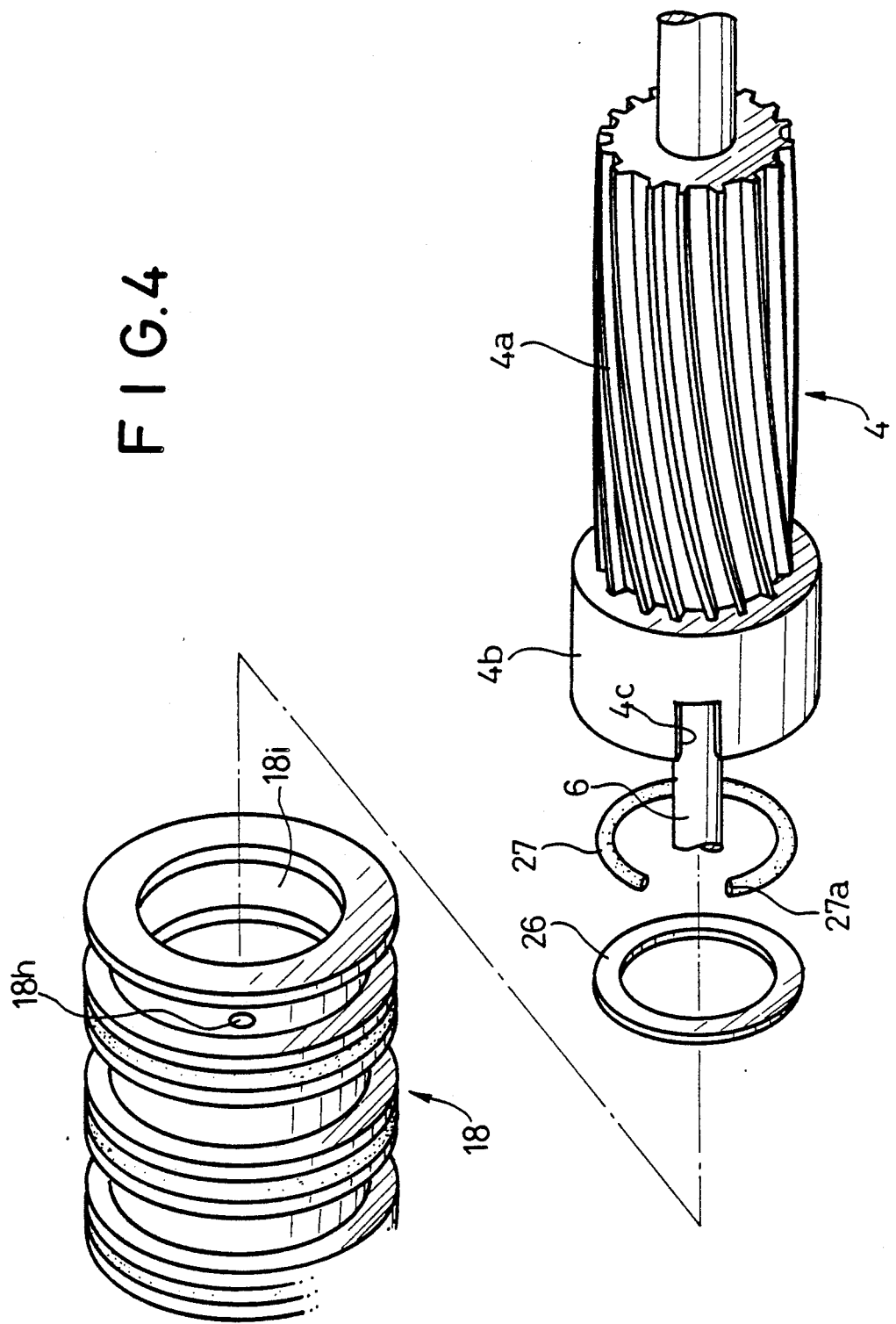
FIG. 4 is an exploded, perspective view of an output shaft and the valve sleeve.

As will be noted from FIGS. 2 to 4, in the apparatus of the present embodiment, an annular buffering member 26 which comprises a material such as resin or rubber is interposed between a step 18i inside the valve sleeve 18 and the end face defined at the cylindrical portion 4b of the output shaft 4. Another buffering member 27, which is circular in section and which also comprises a material such as resin or rubber, is interposed between the greater diameter portion 18e of the valve sleeve 18, located nearer the output shaft 4, and the outer periphery of the cylindrical portion 4b of the output shaft 4. As shown in FIG. 4, the buffering member 27 is substantially C-shaped, including a notch 27a which is formed to avoid the pin 20. It is also to be noted that a usual O-ring may be used instead by displacing the axial location to the pin 20. The buffering members 26 and 27 disposed between the end face of the valve sleeve 18 located nearer the output shaft 4 or the step 18i of the valve sleeve and the end face of the output shaft 4 or its cylindrical portion 4b, and between the inner surface of the valve sleeve 18 and the outer surface of the output shaft 4 serve to suppress any vibration of the valve sleeve 18 which may be caused by the flow of the driven oil, due to the attenuating effect of the buffering member 26. In addition, the provision of these buffering members also acts to diminish the transmission of vibrations to the input shaft 2 through the output shaft 4 and the torsion bar 6. As a consequence, acoustical oscillations caused by the flow of the fluid are diminished, thus providing a power steering apparatus of low noise. Since there is no relative movement between the valve sleeve 18 and the output shaft 4 essentially, there is no likelihood that an inconvenience such as a hysteresis in the operation of the valve may be caused.

Figure 5:
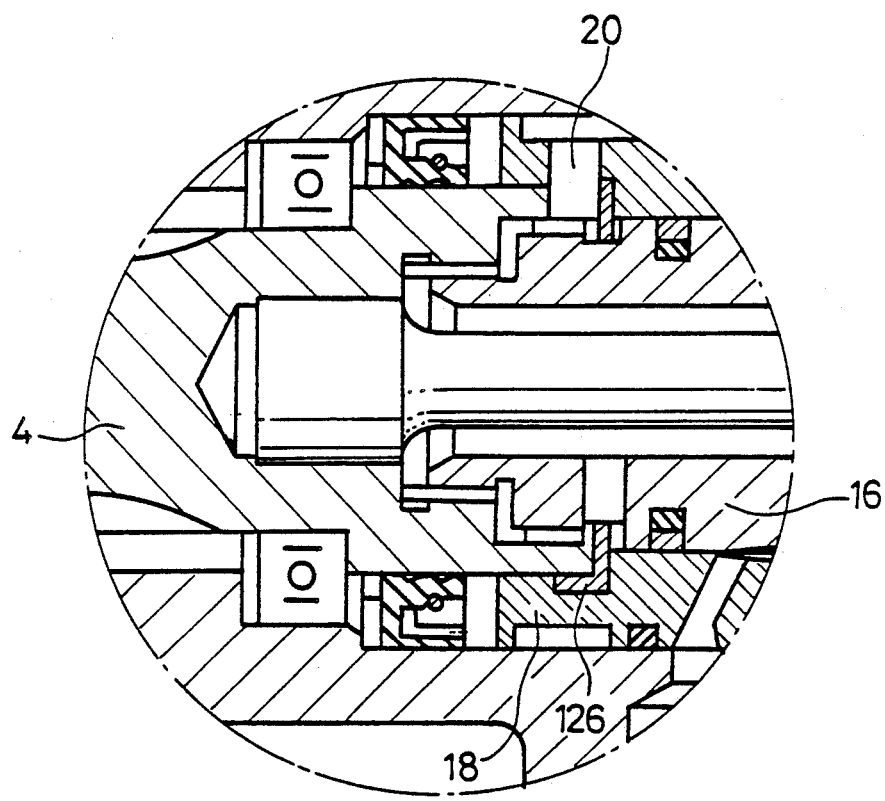
FIG. 5 is a longitudinal section of part of a second embodiment.
Figure 6:
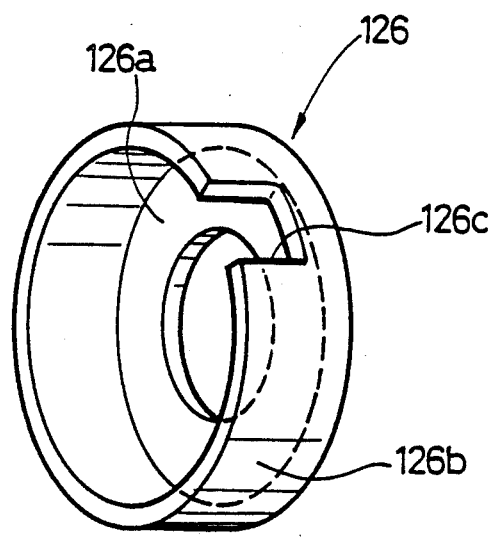
FIG. 6 is a perspective view of a buffering member used in the second embodiment.

It is to be understood that only one of the buffering members 26 and 27 may be used. In addition, while the buffering member 26 is illustrated in the form of a flat ring in the embodiment mentined above, the configuration of the buffering member is not limited thereto, the only requirement being that such buffering member may be interposed between the output shaft 4 and the valve sleeve 18 to exert an attenuating effect upon the vibration of the valve sleeve 18. By way of example, as shown in FIGS. 5 and 6, a buffering member 126 may be configured so that the outer periphery of a flat ring 126a may be extended toward the output shaft 4 to form a cylindrical portion 126b. The flat portion 126a may be held between the output shaft 4 and the axially opposite surface of the valve sleeve 18, and the cylindrical portion 126b may be held between the outer surface of the output shaft 4 and the inner surface of the valve sleeve 18. A notch 126c in the cylindrical portion 126b shown in FIG. 6 is defined to allow the pin 20, which is used to connect the output shaft 4 and the valve sleeve 18 together, to extend therethrough.

While the invention has been disclosed above in connection with several embodiments thereof, it should be understood that a number of changes, modifications and substitutions therein will readily occur to one skilled in the art from the above disclosure without departing from the scope and spirit of the invention defined by the appended claims.

What is claimed is:

1. In a power steering apparatus including an input shaft which is driven for rotation by a turning operation of a steering wheel, an output shaft connected to the input shaft in coaxial relationship by a torsion bar, a valve rotor formed around the outer surface of the input shaft, and a valve sleeve fitted in surrounding relationship with the valve rotor and disposed between an end face of the output shaft and a retainer mounted on the input shaft, the sleeve being connected to the output shaft by a pin for integral rotation;

the improvement wherein a buffering member is interposed between mutually axially facing surfaces on the output shaft and the valve sleeve to thereby suppress any vibration of the valve sleeve which may be caused by the flow of driven oil and to thereby diminish the transmission of vibrations to the input shaft through the output shaft and the torsion bar, wherein an inner surface of the valve sleeve has a greater diameter portion at its one end into which a cylindrical portion formed at one end of the output shaft is fitted, the mutually facing surfaces being defined by the cylindrical portion having an axially facing end face which opposes an axially facing step defined between the greater diameter portion and a smaller diameter portion of the inner surface of the valve sleeve, and wherein said buffering member is an annular unitary member which is L-shaped in cross section and comprises an annular axially extending portion and a radially extending portion extending radially inwardly from the axially extending portion, the axially extending portion being interposed between the axially facing end face of the cylindrical portion of the output shaft and the step in the valve sleeve, the radially extending portion being interposed between the inner surface of the valve sleeve and the outer surface of the cylindrical portion of the output shaft.

2. The power steering apparatus according to claim 1 in which the buffering member is interposed between the axially facing end face of the cylindrical portion of the output shaft and the axially facing step of the valve sleeve.

3. The power steering apparatus according to claim 2 in which the buffering member is annular.

4. The power steering apparatus according to claim 1 in which a further buffering member is interposed between the inner surface of the greater diameter portion of the valve sleeve and the outer surface of the cylindrical portion of the output shaft.

5. The power steering apparatus according to claim 4, in which the further buffering member is C-shaped.

* * * * *